United States Patent
Rivolta et al.

(10) Patent No.: US 12,471,811 B2
(45) Date of Patent: Nov. 18, 2025

(54) SENSOR RELIABILITY DETECTION AND POWER MANAGEMENT

(71) Applicant: STMICROELECTRONICS S.R.L., Agrate Brianza (IT)

(72) Inventors: Stefano Paolo Rivolta, Desio (IT); Roberto Mura, Milan (IT)

(73) Assignee: STMICROELECTROINCS S.R.L., Agrate Brianza (IT)

( * ) Notice: Subject to any disclaimer, the term of this patent is extended or adjusted under 35 U.S.C. 154(b) by 692 days.

(21) Appl. No.: 17/933,739

(22) Filed: Sep. 20, 2022

(65) Prior Publication Data

US 2024/0090800 A1 Mar. 21, 2024

(51) Int. Cl.
*A61B 5/1455* (2006.01)
*A61B 5/00* (2006.01)
*A61B 5/0205* (2006.01)
*G01R 31/28* (2006.01)

(52) U.S. Cl.
CPC ........ *A61B 5/14552* (2013.01); *A61B 5/0205* (2013.01); *A61B 5/681* (2013.01); *G01R 31/2879* (2013.01); *A61B 2560/0223* (2013.01)

(58) Field of Classification Search
CPC . A61B 5/0205; A61B 5/1455; A61B 5/14551; A61B 5/14552; A61B 5/14542; A61B 5/14532; A61B 5/681; A61B 5/7221
See application file for complete search history.

(56) References Cited

U.S. PATENT DOCUMENTS

| | | | |
|---|---|---|---|
| 6,526,300 B1 * | 2/2003 | Kiani | A61B 5/14552 600/344 |
| 8,352,004 B2 * | 1/2013 | Mannheimer | A61B 5/14552 600/310 |
| 10,966,626 B2 | 4/2021 | Zuckerman-Stark et al. | |
| 2014/0232516 A1 | 8/2014 | Stivoric et al. | |
| 2016/0342781 A1 | 11/2016 | Jeon | |
| 2019/0380655 A1 * | 12/2019 | LeBoeuf | A61B 5/02055 |
| 2021/0022636 A1 | 1/2021 | Zhu | |
| 2021/0312778 A1 * | 10/2021 | Passaniti | G01R 29/14 |
| 2022/0047217 A1 | 2/2022 | Mayo et al. | |

FOREIGN PATENT DOCUMENTS

| | | |
|---|---|---|
| EP | 2980609 A1 | 2/2016 |
| KR | 20110061750 A | 6/2011 |

OTHER PUBLICATIONS

Garmin Customer Support, "The Heart Rate Sensor on My Garmin Watch Is Not Accurate," 1 URL=https://support.garmin.com/en-us/?faq=xQwjQjzUew4BF1GYcusE59#:~:text=The watch must be worn, can actually restrict blood flow, download date Jul. 21, 2022. (4 pages).

* cited by examiner

*Primary Examiner* — Chu Chuan Liu
(74) *Attorney, Agent, or Firm* — Seed Intellectual Property Law Group LLP

(57) ABSTRACT

The present disclosure is directed to a wearable electronic device, such as a watch, that includes one or more optical sensors. In order to determine accuracy of measurements by the optical sensors, the device detects whether or not the optical sensors are in physical contact with the user's skin. The device detects a level of contact between the user's skin and the optical sensors based on electrostatic charge variation measurements, and generates a contact reliability index (CRI) based on the level of contact. Operation of the optical sensors are adjusted based on the CRI.

22 Claims, 3 Drawing Sheets

SENSOR RELIABILITY DETECTION AND POWER MANAGEMENT

BACKGROUND

Technical Field

The present disclosure is directed to devices and methods for reliability detection and power management for sensors.

Description of the Related Art

Heart rate and oxygen (e.g., SpO2) sensors are increasingly in popularity, and are included in wide range of electronic devices. Many electronic watches, chest straps, bracelets, and mobile devices include heart rate and oxygen sensors for a variety health applications, such as tracking athletic performance, managing stress levels, tracking health, and activity recognition.

Heart rate sensors measure the heart rate of the user's heart, and oxygen sensors measure the oxygen levels in the user's blood. Many heart rate and oxygen sensors utilized optic measurements to determine heart rate and oxygen levels. For example, heart rate monitors typically utilize optical sensors to detect an amount of light absorption or reflection of a user's blood, and determine a heart rate based on the detected amount of light absorption or reflection. This process referred to as photoplethysmography (PPG). Oxygen sensors typically utilize optical sensors to detect a color of the user's blood, and determine oxygen level based on the detected color.

Optical sensors like heart rate and oxygen sensors unfortunately have several issues in practice. For example, an optical sensor should remain in constant physical contact with the user's skin in order to obtain accurate measurements from the optical sensor. Absent proper physical contact, measurements by the optical sensor may be inaccurate or even missing. However, it is not practical to assume the optical sensor will remain in constant contact with a user's skin. Many users, for example, wear their watch loosely, which causes the watch to slide around the user's wrist and create a gap between the optical sensor and the user's skin. In addition, optical sensors, such as heart rate and oxygen sensors, generally consume large amounts of power. Thus, it is not ideal for an optical sensor to continuously obtain measurements.

BRIEF SUMMARY

The present disclosure is directed to a wearable electronic device, such as a watch, that includes one or more optical sensors. The optical sensors utilize various optics, light sources, and light sensors to detect various parameters. For example, the optical sensors may include heart rate and oxygen sensors that measure a user's heart rate and oxygen levels, respectively. As the optical sensors are measuring, for example, parameters related to the user's blood, the optical sensors should be in physical contact with the user's skin in order to obtain accurate measurements.

In order to determine the accuracy of measurements by the optical sensors, the device detects whether or not the optical sensors are in physical contact with the user's skin using an electrostatic charge sensor, a receiving electrode electrically coupled to the electrostatic charge sensor, and a ground electrode electrically coupled to ground. The receiving and ground electrodes are positioned adjacent to the optical sensors such that a user's skin will concurrently contact the receiving and ground electrodes and the optical sensors.

The device detects a level of contact between the user's skin and the optical sensors based on the electrostatic charge variation measured by the electrostatic charge sensor, and generates a contact reliability index (CRI) based on the level of contact. The CRI indicates measurements by the optical sensors are reliable in response to detecting a strong level of contact between the user's skin and the optical sensors, moderately reliable in response to detecting a moderate level of contact between the user's skin and the optical sensors, and unreliable in response to detecting a weak level of contact between the user's skin and the optical sensors.

Operation of the optical sensors are adjusted based on the CRI. For example, the optical sensors are turned on or off and a sampling rate of the optical sensors are increased or decreased based on the CRI.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

Figure 1:
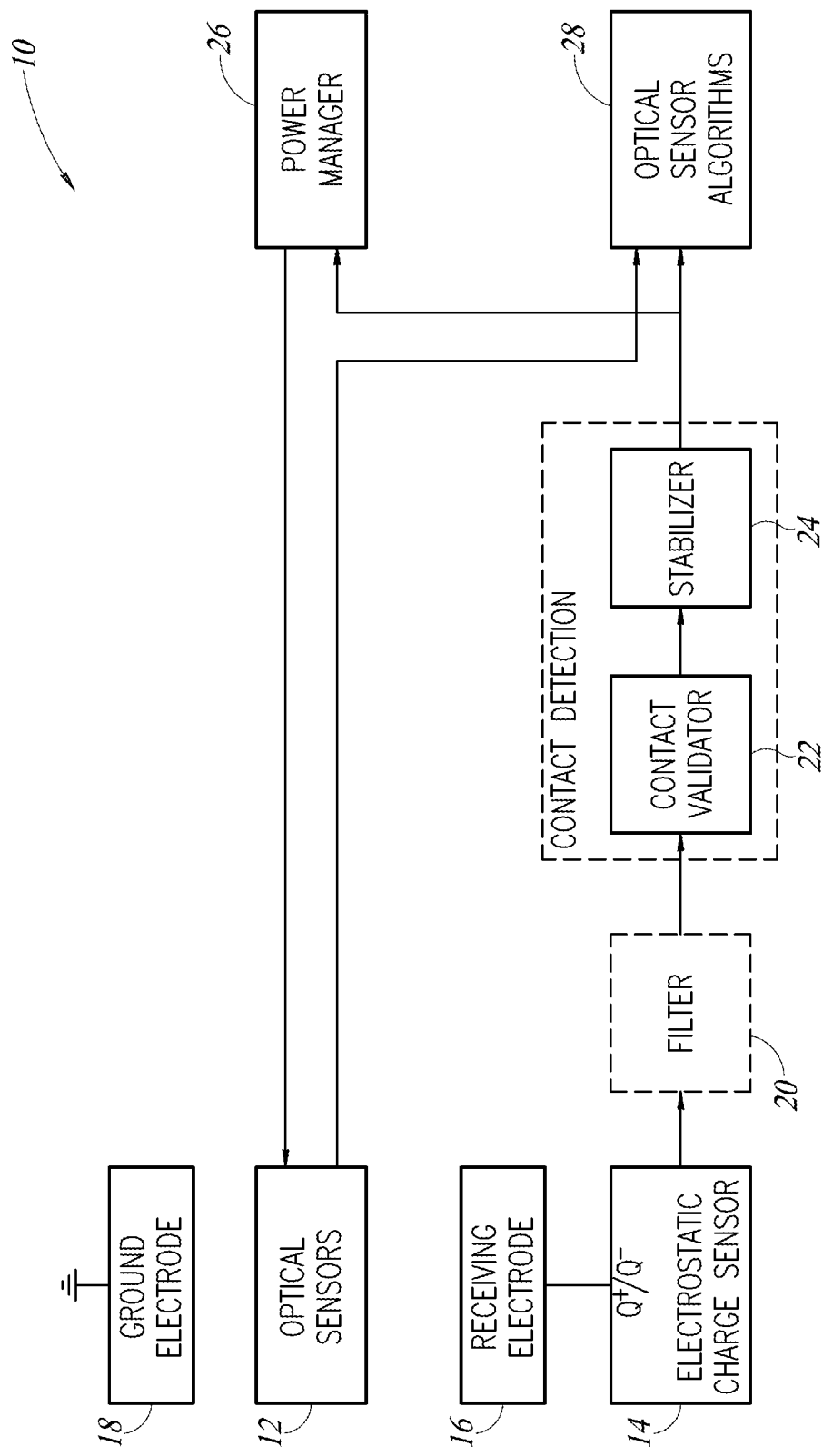
FIG. 1 is a block diagram of a device according to an embodiment disclosed herein.

In the following description, certain specific details are set forth in order to provide a thorough understanding of various aspects of the disclosed subject matter. However, the disclosed subject matter may be practiced without these specific details. In some instances, well-known structures and methods of manufacturing and operation of electronic components, electronic wearable devices, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, optical sensors like heart rate and oxygen sensors have several issues in practice. For instance, an optical sensor should remain in constant physical contact with the user's skin in order to obtain accurate measurements. Further, optical sensors generally consume large amounts of power. One possible solution to these issues is to include a motion sensor, such as an accelerometer, in the electronic device to detect motion of the device. When motion is detected, the device may assume the device is currently in use and turn the optical sensor on to begin measuring. Conversely, when no motion is detected, the device may assume the device is not in use and turn the optical sensor off to stop measuring. Although this approach may conserve power of the electronic device, motion is not correlated to physical contact between the optical sensor and the user's skin. Thus, measurements by the optical sensor may still be inaccurate.

The present disclosure is directed to an electronic device that is worn by a user. The device includes one or more optical sensors, such as heart rate and oxygen sensors, that physically contact the user's skin when the device is worn by the user. The device determines whether or not the optical sensors are in physical contact with the user's skin using an electrostatic charge sensor. Upon detecting the optical sensors are in physical contact with the user's skin, the optical sensors begin measuring. Conversely, the optical sensors stop measuring upon detecting the optical sensors are no longer in physical contact with the user's skin. As a result, the optical sensor may reliably obtain accurate measurements, and power of the device may be conserved.

FIG. 1 is a block diagram of a device 10 according to an embodiment disclosed herein. The device 10 includes one or more optical sensors that are placed in physical contact with a user, more specifically the user's skin. For example, the device 10 may be an electronic watch, chest strap, bracelet, mobile device, or another type of device that is placed in contact with a user for sensing. The device 10 includes optical sensors 12, an electrostatic charge sensor 14, a receiving electrode 16, a ground electrode 18, a filter 20, a contact validator 22, a stabilizer 24, a power manager 26, and optical sensor algorithms 28.

The optical sensors 12 utilize various optics, light sources, and light sensors to detect various parameters. In one embodiment, the optical sensors 12 include heart rate and oxygen (e.g., SpO2) sensors. The heart rate sensor measures the heart rate of the user's heart. For example, the heart rate monitor utilizes optical sensors to detect an amount of light absorption or reflection of a user's blood, and determine a heart rate based on the detected amount of light absorption or reflection. This process referred to as photoplethysmography (PPG). The oxygen sensor measures the oxygen levels in the user's blood. For example, the oxygen sensor utilizes optical sensors to detect a color of the user's blood, and determine oxygen level based on the detected color. As the optical sensors 12 are measuring, for example, parameters related to the user's blood, the optical sensors 12 should be in physical contact with the user's skin in order to obtain accurate measurements. The optical sensors 12 output the measured parameters to the optical sensor algorithms 28, which will be discussed in further detail below.

The electrostatic charge sensor 14, the receiving electrode 16, and the ground electrode 18 are utilized to perform contact or touch detection to ensure that the optical sensors 12 are in physical contact with the user's skin.

The receiving electrode 16 is electrically coupled to the electrostatic charge sensor 14. In one embodiment, the receiving electrode 16 is electrically coupled to a positive terminal $Q^+$ of the electrostatic charge sensor 14. In one embodiment, the receiving electrode 16 is electrically coupled to a negative terminal $Q^-$ of the electrostatic charge sensor 14. The receiving electrode 16 is made of a conductive material, such as copper. Various sources, such as a user's skin, generates electrostatic charge variation on the receiving electrode 16.

The ground electrode 18 is electrically coupled to the device's 10 ground. For example, the ground electrode 18 and other electrical components (e.g., capacitor, resistor, transistors, processors, the optical sensors 12, the electrostatic charge sensor 14) of the device 10 share the same ground. The ground electrode 18 is made of a conductive material, such as copper. The ground electrode 18 induces a large variation of electrostatic charge generated on the receiving electrode 16 when the user's skin concurrently touches both the receiving electrode 16 and the ground electrode 18.

The receiving electrode 16 and the ground electrode 18 are both conductive surfaces that are exposed to a surrounding environment of the device 10, and are electrically isolated from each other. Further, the receiving electrode 16 and the ground electrode 18 are aligned with each other and positioned on opposite sides of the optical sensors 12 (e.g., within 1 to 3 millimeters of respective sides of the optical sensors 12). A user's skin is able to concurrently touch the receiving electrode 16, the ground electrode 18, and the optical sensors 12. As the receiving electrode 16 and the ground electrode 18 are positioned on opposite sides of and in close proximity to the optical sensors 12, the user's skin will contact the optical sensors 12 upon contacting the receiving electrode 16 and the ground electrode 18. As such, performing contact detection with the receiving electrode 16 and the ground electrode 18 also indicates contact of the optical sensors 12.

Figure 2:
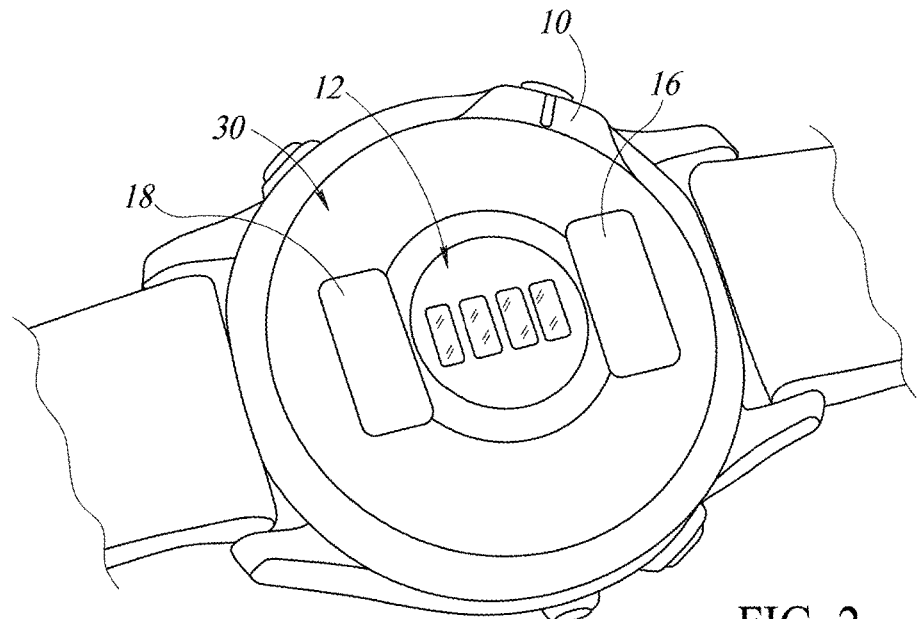
FIG. 2 is a device according to an embodiment disclosed herein.

As an example, FIG. 2 is the device 10 according to an embodiment disclosed herein. In this case, the device 10 is an electronic watch, sometimes referred to as a smart watch. The watch has various functions in addition to time keeping, such as tracking athletic performance, managing stress levels, tracking health, and activity recognition. The backside of the watch, which faces the user's wrist when being worn, is shown in FIG. 2.

The optical sensors 12, the receiving electrode 16, and the ground electrode 18 are positioned on a back surface 30 of a housing or casing of the watch. The remaining components (e.g., the electrostatic charge sensor 14, the filter 20, the contact validator 22, the stabilizer 24, the power manager 26, and the optical sensor algorithms 28) are positioned within the housing of the watch. The optical sensors 12 are positioned at a center portion of the back surface 30, and the receiving electrode 16 and the ground electrode 18 are aligned with each other and positioned on opposite sides of the optical sensors 12. Stated differently, the receiving electrode 16 is spaced from the ground electrode 18 by the optical sensors 12. With this configuration, the user's skin will contact the optical sensors 12 when contacting the receiving electrode 16 and the ground electrode 18.

Although the receiving electrode 16 and the ground electrode 18 are rectangular in shape in FIG. 2, other shapes are also possible. For example, each of the receiving electrode 16 and the ground electrode 18 may have an arch shape such that the receiving electrode 16 and the ground electrode 18 together encircle the optical sensors 12 (e.g., the receiving electrode 16 and the ground electrode 18 may be mirrored arches). Returning to FIG. 1, the electrostatic charge sensor 14 is electrically coupled to the receiving electrode 16, and receives electrostatic charge variation on the receiving electrode 16. In one embodiment, the electrostatic charge sensor 14 is embedded in a multi-sensor device that includes a plurality of different sensors (e.g., the optical sensors 12, motion sensors, pressure sensors, etc.). The multi-sensor device also includes its own onboard memory and processor. The processor is configured to process data generated by the sensors; and execute simple programs, such as finite state machines and decision tree logic.

The electrostatic charge sensor 14 measures electrostatic charge variation (i.e., a change in electrostatic charge) generated on the receiving electrode 16. The electrostatic charge sensor 14 provides electrostatic charge variation measurements to the filter 20, which in turn provides the filtered electrostatic charge variation measurements to the contact validator 22. As will be discussed in further detail below, the contact validator 22 generates a contact reliability index (CRI) based on the electrostatic charge variation measurement.

In a case where the receiving electrode 16 is electrically coupled to a positive terminal $Q^+$ of the electrostatic charge sensor 14, the electrostatic charge sensor 14 measures electrostatic charge variation detected by the receiving electrode 16 as a positive value when a user's skin touches both the receiving electrode 16 and the ground electrode 18. In a case where the receiving electrode 16 is electrically coupled to a negative terminal $Q^-$ of the electrostatic charge sensor 14, the electrostatic charge sensor 14 measures electrostatic charge variation detected by the receiving electrode 16 as a negative value when a user's skin touches both the receiving electrode 16 and the ground electrode 18.

The electrostatic charge sensor 14 includes various electronic components (e.g., capacitors, resistors, amplifiers, etc.) to measure electrostatic charge variation. The electrostatic charge sensor 14, for example, includes amplifiers to boost a measured electrostatic charge signal, and an analog-to-digital converter to convert a measured electrostatic charge signal to a digital value and output measured electrostatic charge as a digital value.

Figure 3:
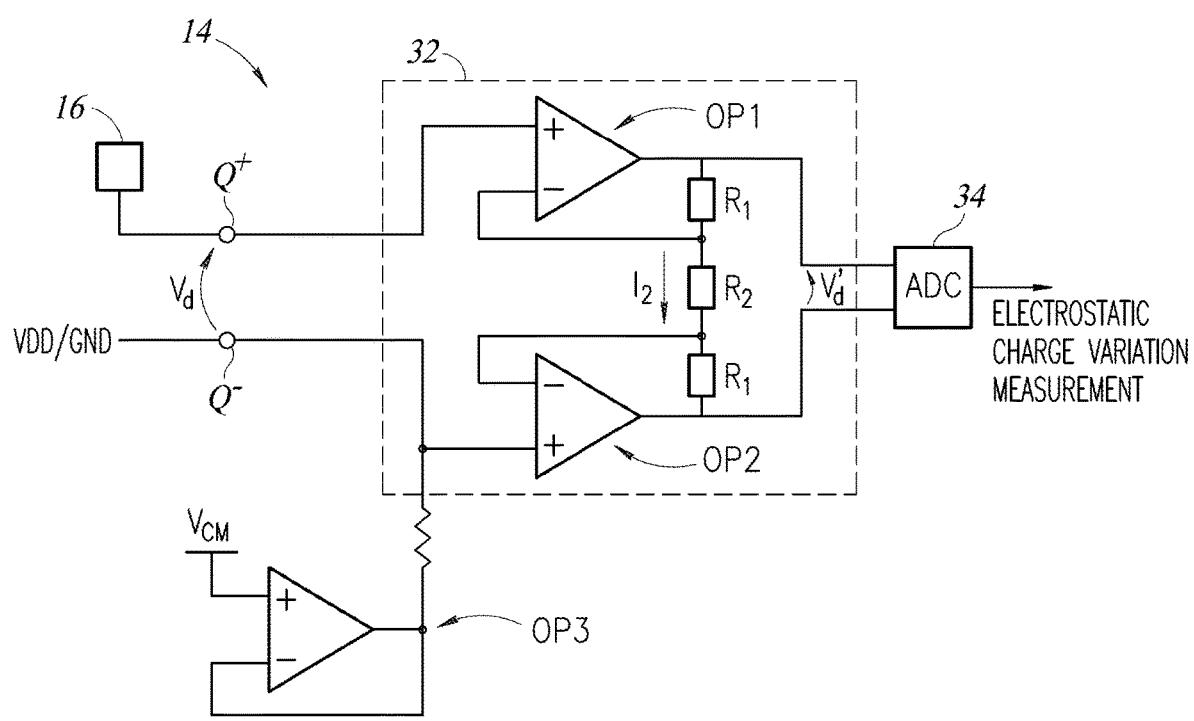
FIG. 3 is an electrostatic charge sensor according to an embodiment disclosed herein.

As an example, FIG. 3 is the electrostatic charge sensor 14 according to an embodiment disclosed herein. The electrostatic charge sensor 14 includes a positive terminal $Q^+$ and a negative terminal $Q^-$. In this example, the receiving electrode 16 is coupled to the positive terminal $Q^+$, and the negative terminal $Q^-$ is coupled to an input voltage VDD or ground GND. Alternatively, as discussed above, the receiving electrode 16 may be coupled to the negative terminal $Q^-$, and the input voltage VDD or ground GND may be coupled to the positive terminal $Q^+$.

The positive terminal $Q^+$ and the negative terminal $Q^-$ receive an input voltage $V_d$ (a differential signal), and supplies the input voltage $V_d$ to an instrumentation amplifier 32. A user's skin contacting the receiving electrode 16, along with the ground electrode 18, generates a variation of electrostatic charge, which, in turn, after having been detected by the receiving electrode 16, generates the input voltage $V_d$.

The instrumentation amplifier 32 includes operational amplifiers OP1, OP2 and a biasing stage (buffer) OP3. The biasing stage OP3 biases the instrumentation amplifier 32 to a common mode voltage $V_{CM}$.

An inverting terminal of the amplifier OP1 is electrically connected to an inverting terminal of the amplifier OP2 through a resistor $R_2$ across which there is a voltage equal to the input voltage $V_d$. Therefore, a current equal to $I_2=V_d/R_2$ will flow through this resistor $R_2$. The current $I_2$ does not come from the input terminals of the operational amplifiers OP1, OP2, and, therefore, runs through two resistors $R_1$ connected between the outputs of the operational amplifiers OP1, OP2, in series with the resistor $R_2$. The current $I_2$, which runs through the series of the three resistors $R_1$-$R_2$-$R_1$, produces a differential output voltage $V_d'$, which is given by $V_d'=(2R_1+R_2)I_2=(2R_1+R_2)V_d/R_2$. The overall gain of the circuit of FIG. 2 is $Ad=V_d'/V_d=(2R_1+R_2)/R_2=1+2R_1/R_2$. The differential gain depends on the value of the resistor $R_2$ and may therefore be modified by acting on the resistor $R_2$.

The differential output voltage $V_d'$, therefore being proportional to the potential $V_d$ between the positive terminal $Q^+$ and the negative terminal $Q^-$, is input to an analog-to-digital converter (ADC) 34, which outputs a charge variation signal. The charge variation signal is, for example, a high-resolution digital stream (e.g., 16 bits or 24 bits). The charge variation signal is an electrostatic charge variation measurement of an electrostatic charge variation in a surrounding environment.

In another embodiment, the instrumentation amplifier 32 is omitted, so that the ADC 34 receives the differential output voltage $V_d$ between the electrodes $E_1$, $E_2$ and samples the differential output voltage $V_d$ directly. In another embodiment, the ADC 34 is omitted, and the charge variation signal is the differential output voltage $V_d$.

Returning to FIG. 1, the electrostatic charge sensor 14 outputs electrostatic charge variation measurements to the filter 20.

The filter 20 is communicatively coupled to the electrostatic charge sensor 14, and receives an electrostatic charge variation measurement from the electrostatic charge sensor 14. The filter 20 filters the electrostatic charge variation measurement to remove certain frequencies from the electrostatic charge variation measurement (e.g., noise, electrostatic charge variation caused by unwanted sources, such as an AC power line, etc.). The filter 20 may apply a low pass filter, a high pass filter, a band pass filter, or a combination thereof to the electrostatic charge variation measurement. The filter 20 outputs the filtered electrostatic charge variation measurement to the contact validator 22 for contact detection. In some embodiments, the filter 20 is omitted, and the contact validator 22 receives the electrostatic charge variation measurement from the electrostatic charge sensor 14.

Contact detection is performed using the (filtered) electrostatic charge variation measurement. Contact detection is performed by the contact validator 22 and the stabilizer 24.

The contact validator 22 is communicatively coupled to the filter 20, and receives the filtered electrostatic charge variation measurement from the filter 20. The contact validator 22 generates a contact reliability index (CRI) based on the electrostatic charge variation measurement. The CRI indicates a level of reliability or accuracy of a current measurement by the optical sensors 12. For example, in the embodiment where the optical sensors 12 include heart rate and oxygen sensors, the CRI indicates a level of reliability of the measured heart rate generated by the heart rate sensor and the measured oxygen level generated by the oxygen sensor. The CRI may be a bit value that indicates the level of reliability.

The CRI indicates the level of reliability of a measurement by the optical sensors 12 as reliable, moderately reliable, and unreliable. Stated differently, the CRI indicates the level of accuracy of a measurement by the optical sensors 12 as accurate, moderately accurate (e.g., includes some acceptable error), and inaccurate.

As the optical sensors 12 are measuring, for example, parameters related to the user's blood, the level of reliability is proportional to the amount of physical contact between the optical sensors 12 and the user's skin. The CRI indicates a reliable measurement in response to detecting the optical sensors 12 are in physical contact with the user's skin.

Conversely, the CRI indicates an unreliable measurement in response to detecting the optical sensors 12 are not in physical contact with the user's skin for extended periods of time (e.g., 3 to 5 seconds). The CRI indicates a moderately reliable measurement (e.g., within an acceptable level of error) in response to detecting the optical sensors 12 are in physical contact with the user's skin but intermittently lose physical contact with the user's skin for short periods of time (e.g., 0.1 to 0.5 milliseconds). For example, in a case where the device 10 is a watch worn by the user as shown in FIG. 2, moderately accurate measurements may occur during arm movements by the user.

Contact detection between the optical sensors 12 and the user's skin is performed with the electrostatic charge sensor 14, the receiving electrode 16, and the ground electrode 18. As discussed above, the user's skin will contact the optical sensors 12 upon contacting the receiving electrode 16 and the ground electrode 18, as the receiving electrode 16 and the ground electrode 18 are positioned on opposite sides of and in close proximity to the optical sensors 12. As a result, the contact detection with the receiving electrode 16 and the ground electrode 18 in turn indicates whether or not the user's skin is in physical contact with the optical sensors 12.

The electrostatic charge sensor 14 measures a saturated electrostatic charge variation (e.g., a large non-zero positive voltage level in a case where the receiving electrode 16 is electrically coupled to the positive terminal $Q^+$, and a large non-zero negative voltage level in a case where the receiving electrode 16 is electrically coupled to the negative terminal Q) in response to the user's skin concurrently touching the receiving electrode 16 and the ground electrode 18, measures a near saturated electrostatic charge variation in response to the user's skin intermittently touching the receiving electrode 16 and/or the ground electrode 18, and measures a floating electrostatic charge variation (e.g., a near zero voltage level) in response to the user's skin not touching the receiving electrode 16 and/or the ground electrode 18. Accordingly, the contact validator 22 generates a CRI indicating a reliable measurement in response to detecting a saturated electrostatic charge variation, a moderately reliable measurement in response to detecting a near saturated electrostatic charge variation, and an unreliable measurement in response to detecting a small electrostatic charge variation. For example, the contact validator 22 generates a CRI indicating a reliable measurement in response to detecting an electrostatic charge variation that is greater than a first threshold value, a moderately reliable measurement in response to detecting an electrostatic charge variation that is less than the first threshold value and greater than a second threshold value smaller than the first threshold value, and an unreliable measurement in response to detecting an electrostatic charge variation that is less than the second threshold value.

Figure 4:
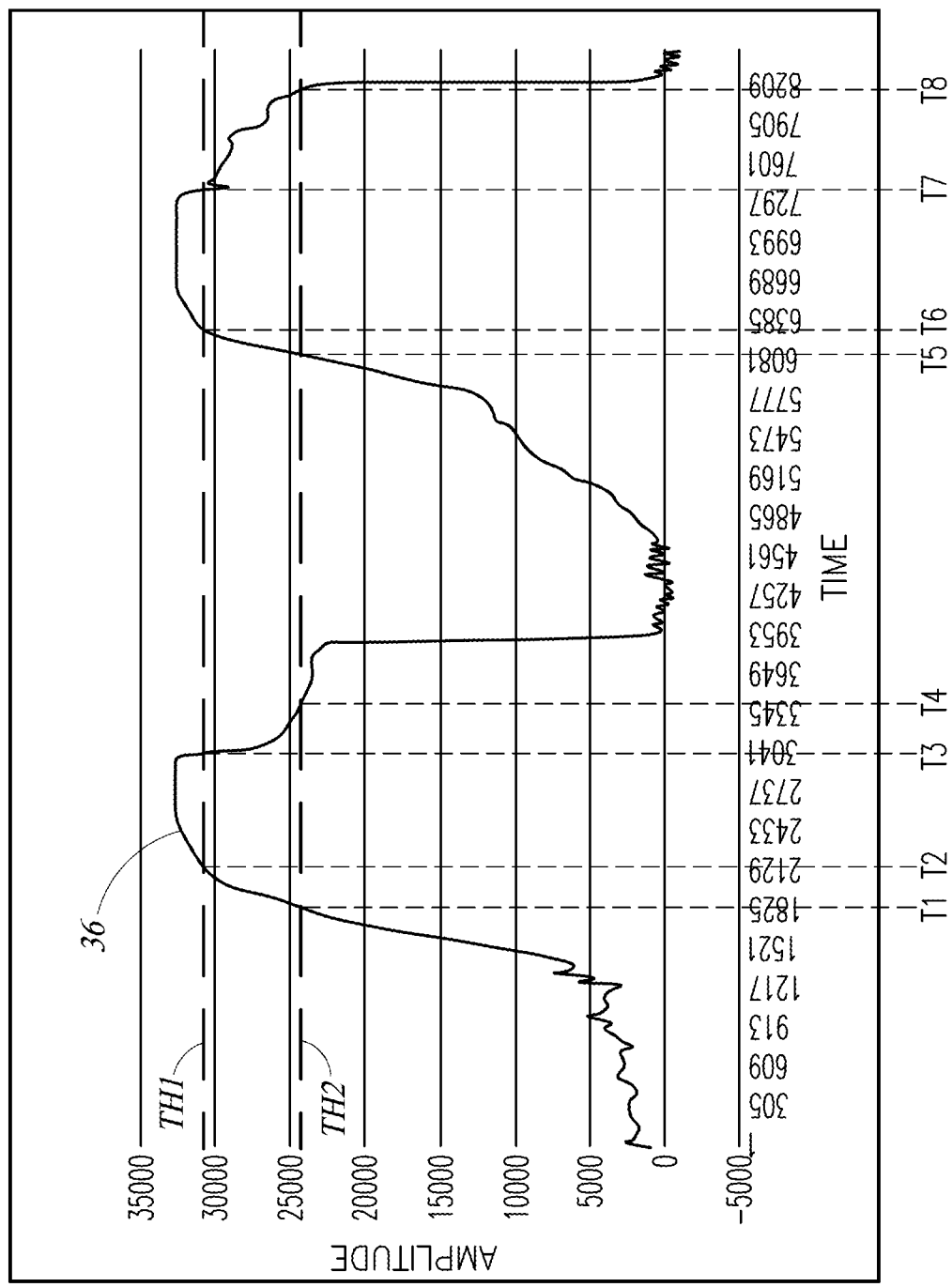
FIG. 4 is an electrostatic charge variation signal according to an embodiment disclosed herein.

As an example, FIG. 4 is an electrostatic charge variation signal 36 according to an embodiment disclosed herein. The electrostatic charge variation signal 36 is measured by the electrostatic charge sensor 14.

In FIG. 4, the vertical axis is an amplitude axis, and the horizontal axis is a time axis. The amplitude may have any type of amplitude unit, such as a voltage level or a digital value generated by the ADC 34 discussed with respect to FIG. 3. The time axis may have any type of time unit, such as millisecond, seconds, or a number of samples.

Between times T2 and T3 and times T6 and T7, the contact validator 22 determines the electrostatic charge variation signal 36 is greater than a first threshold value TH1. In this case, the user's skin is concurrently touching the receiving electrode 16 and the ground electrode 18, which in turn indicates the user's skin is also touching the optical sensors 12. As such, the contact validator 22 generates a CRI indicating a reliable measurement.

Between times T1 and T2, times T3 and T4, times T5 and T6, and times T7 and T8, the contact validator 22 determines the electrostatic charge variation signal 36 is less than the first threshold value TH1 and greater than a second threshold value TH2, which is less than the first threshold value TH1. In this case, the user's skin is intermittently touching the receiving electrode 16 and/or the ground electrode 18, which in turn indicates the user's skin is also intermittently touching the optical sensors 12. As such, the contact validator 22 generates a CRI indicating a moderately reliable measurement.

Before time T1, between times T4 and T5, and after time T8, the contact validator 22 determines the electrostatic charge variation signal 36 is less than the second threshold value TH2. In this case, the user's skin is not touching the receiving electrode 16 and/or the ground electrode 18, which in turn indicates the user's skin is also not touching the optical sensors 12. As such, the contact validator 22 generates a CRI indicating an unreliable measurement.

In one embodiment, the contact validator 22 generates the CRI based on an average electrostatic charge variation measurement over a determined amount of time. As a result, the effect of losing physical contact for a short period of time is mitigated.

Returning to FIG. 1, the contact validator 22 outputs the CRI to the stabilizer 24.

The stabilizer 24 is communicatively coupled to the contact validator 22, and receives the CRI from the contact validator 22. The stabilizer 24 stabilizes the CRI to prevent the CRI from switching between values (e.g., between reliable, moderately reliable, and unreliable) frequently. In one embodiment, the stabilizer 24 determines whether or not the CRI remains the same value for a determined amount of time (e.g., 0.5 to 1 seconds), and outputs the CRI in response to determining the CRI remained the same for the determined amount of time. The stabilizer 24 outputs the stabilized CRI to the power manager 26 and the optical sensor algorithms 28.

The power manager 26 is communicatively coupled to the stabilizer 24 and the optical sensors 12. The power manager 26 receives the CRI from the stabilizer 24, and adjusts operation of the optical sensors 12 based on the CRI.

In a case where the CRI indicates measurements by the optical sensors 12 are reliable, the power manager 26 instructs the optical sensors 12 to be in an on state. In the on state, the optical sensors 12 begin or continue to obtain measurements. For example, in the embodiment where the optical sensors 12 include heart rate and oxygen sensors, the CRI begins or continues to measure heart rate and oxygen levels. In addition, the power manager 26 instructs the optical sensors 12 to decrease a sampling rate of the parameters. Stated differently, the power manager 26 instructs the optical sensors 12 to reduce the amount of measurements taken. As a result, power consumption is reduced.

In a case where the CRI indicates measurements by the optical sensors 12 are moderately reliable, the power manager 26 instructs the optical sensors 12 to be in an on state. In the on state, as discussed above, the optical sensors 12 begin or continue to obtain measurements, such as heart rate and oxygen levels. In addition, the power manager 26 instructs the optical sensors 12 to increase a sampling rate of the parameters. Stated differently, the power manager 26 instructs the optical sensors 12 to increase the amount of measurements taken. The sampling rate is increased so that the measurement error of the parameters may be averaged.

In a case where the CRI indicates measurements by the optical sensors 12 are unreliable, the power manager 26 instructs the optical sensors 12 to be in an off state. In the off state, the optical sensors 12 stop obtaining measurements, such as heart rate and oxygen levels. As a result, power is not wasted to obtain inaccurate measurements.

The optical sensor algorithms 28 are communicatively coupled to the optical sensors 12 and the stabilizer 24. The optical sensor algorithms 28 receive measurements by the optical sensors 12 and the CRI from the stabilizer 24, and execute various applications of the device 10 based on the measurements and the CRI. For example, in the embodiment where the optical sensors 12 include heart rate and oxygen sensors, the optical sensor algorithms 28 display the measured heart rate and oxygen levels on a display of the device 10 in response to the CRI indicating measurements by the optical sensors 12 are reliable or moderately reliable. As another example, the optical sensor algorithms 28 issue a warning to the user in response to the CRI indicating measurements by the optical sensors 12 are moderately reliable or unreliable. The warning may also inform the user that the device 10 is being worn improperly.

In one embodiment, in a case where the optical sensors 12 and/or the electrostatic charge sensor 14 are included in a multi-sensor device as discussed above, one or more of the various blocks in FIG. 1 (e.g., the filter 20, the contact validator 22, the stabilizer 24, the power manager 26, the optical sensor algorithms 28) is performed by the processor included in the multi-sensor device. In one embodiment, one or more of the various blocks in FIG. 1 is performed by a general-purpose processor of the device 10. In one embodiment, processing is split between the processor of the multi-sensor device and the general-purpose processor of the device 10. For example, the filter 20, the contact validator 22, the stabilizer 24, and the power manager 26 are executed by the processor of the multi-sensor device; and the optical sensor algorithms 28 are executed by the general-purpose processor of the device 10.

The various embodiments disclosed herein provide a wearable electronic device, such as a watch, that includes one or more optical sensors. In order to determine accuracy of measurements by the optical sensors, the device detects whether or not the optical sensors are in physical contact with the user's skin. The device detects a level of contact between the user's skin and the optical sensors based on electrostatic charge variation measured by an electrostatic charge sensor, and generates a contact reliability index (CRI) based on the level of contact. Operation of the optical sensors are adjusted based on the CRI.

A device may be summarized as including an optical sensor configured to generate a measurement; a ground electrode electrically coupled to ground; a receiving electrode configured to receive electrostatic charge variation, the receiving electrode being spaced from the ground electrode by the optical sensor; an electrostatic charge sensor electrically coupled to the receiving electrode, the electrostatic charge sensor configured to measure the electrostatic charge variation; and a processor configured to determine a level of accuracy of the measurement based on the measured electrostatic charge variation.

The processor may be configured to generate a reliability index based on the level of accuracy of the measurement.

The processor may be configured to determine the measured electrostatic charge variation is greater than a threshold value, the reliability index indicating the measurement is reliable in response to the measured electrostatic charge variation being determined to be greater than the threshold value.

The electrostatic charge sensor may be configured to generate another measurement in response to the measured electrostatic charge variation being determined to be greater than the threshold value.

The electrostatic charge sensor may be configured to decrease a sampling rate of measurements in response to the measured electrostatic charge variation being determined to be greater than the threshold value.

The processor may be configured to determine the measured electrostatic charge variation is less than a first threshold value and greater than a second threshold value smaller than the first threshold value, the reliability index indicating the measurement is moderately reliable in response to the measured electrostatic charge variation being determined to be less than the first threshold value and greater than the second threshold value.

The electrostatic charge sensor may be configured to generate another measurement in response to the measured electrostatic charge variation being determined to be less than the first threshold value and greater than the second threshold value.

The electrostatic charge sensor may be configured to increase a sampling rate of measurements in response to the measured electrostatic charge variation being determined to be less than the first threshold value and greater than the second threshold value.

The processor may be configured to determine the measured electrostatic charge variation is less than a threshold value, the reliability index indicating the measurement is unreliable in response to the measured electrostatic charge variation being determined to be less than the threshold value.

The electrostatic charge sensor may be configured to stop measurement in response to the measured electrostatic charge variation being determined to be less than the threshold value.

The processor may be configured to generate a warning in response to the measured electrostatic charge variation being determined to be less than the threshold value.

The processor may be configured to generate the reliability index in response to the reliability index remaining the same value for a determined amount of time.

The processor may be configured to adjust operation of the optical sensor based on the level of accuracy of the measurement.

The optical sensor may include at least one of a heart rate sensor or an oxygen sensor.

The processor may be configured to filter the measured electrostatic charge variation to remove frequencies from the measured electrostatic charge variation.

A method may be summarized as including generating, by an optical sensor, a measurement; receiving, by a receiving electrode, electrostatic charge variation, the optical sensor being positioned between the receiving electrode and a ground electrode electrically coupled to ground; measuring, by an electrostatic charge sensor, the electrostatic charge variation; generating a reliability index of the measurement based on the measured electrostatic charge variation; and adjusting operation of the optical sensor based on the reliability index.

The method may further include determining the measured electrostatic charge variation is greater than a threshold value, the reliability index indicating the measurement is reliable in response to determining the measured electrostatic charge variation is greater than the threshold value.

The method may further include determining the measured electrostatic charge variation is less than a first threshold value and greater than a second threshold value smaller than the first threshold value, the reliability index indicating the measurement is moderately reliable in response to determining the measured electrostatic charge variation is less than the first threshold value and greater than the second threshold value.

The method may further include determining the measured electrostatic charge variation is less than a threshold value, the reliability index indicating the measurement is unreliable in response to determining the measured electrostatic charge variation is less than the threshold value.

A device may be summarized as including an optical sensor configured to generate a measurement; a ground electrode electrically coupled to a ground of the device, the ground electrode positioned on a surface of the device; a receiving electrode configured to receive electrostatic charge variation, the receiving electrode positioned on the surface of the device, the optical sensor positioned between the ground electrode and the receiving electrode; an electrostatic charge sensor configured to measure the electrostatic charge variation; and a processor configured to: generate a reliability index of the measurement based on the measured electrostatic charge variation; and adjust operation of the optical sensor based on the reliability index.

The device may be an electronic watch.

The optical sensor, the ground electrode, and the receiving electrode may be configured to physically contact a user's skin when the device is worn by the user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an optical sensor configured to generate a measurement;
a ground electrode electrically coupled to ground;
a receiving electrode configured to receive electrostatic charge variation, the receiving electrode being spaced from the ground electrode by the optical sensor;
an electrostatic charge sensor electrically coupled to the receiving electrode, the electrostatic charge sensor configured to measure the electrostatic charge variation; and
a processor configured to determine a level of accuracy of the measurement based on the measured electrostatic charge variation.

2. The device of claim 1 wherein the processor is configured to generate a reliability index based on the level of accuracy of the measurement.

3. The device of claim 2 wherein the processor is configured to determine the measured electrostatic charge variation is greater than a threshold value, the reliability index indicating the measurement is reliable in response to the measured electrostatic charge variation being determined to be greater than the threshold value.

4. The device of claim 3 wherein the electrostatic charge sensor is configured to generate another measurement in response to the measured electrostatic charge variation being determined to be greater than the threshold value.

5. The device of claim 3 wherein the electrostatic charge sensor is configured to decrease a sampling rate of measurements in response to the measured electrostatic charge variation being determined to be greater than the threshold value.

6. The device of claim 2 wherein the processor is configured to determine the measured electrostatic charge variation is less than a first threshold value and greater than a second threshold value smaller than the first threshold value, the reliability index indicating the measurement is moderately reliable in response to the measured electrostatic charge variation being determined to be less than the first threshold value and greater than the second threshold value.

7. The device of claim 6 wherein the electrostatic charge sensor is configured to generate another measurement in response to the measured electrostatic charge variation being determined to be less than the first threshold value and greater than the second threshold value.

8. The device of claim 6 wherein the electrostatic charge sensor is configured to increase a sampling rate of measurements in response to the measured electrostatic charge variation being determined to be less than the first threshold value and greater than the second threshold value.

9. The device of claim 2 wherein the processor is configured to determine the measured electrostatic charge variation is less than a threshold value, the reliability index indicating the measurement is unreliable in response to the measured electrostatic charge variation being determined to be less than the threshold value.

10. The device of claim 9 wherein the electrostatic charge sensor is configured to stop measurement in response to the measured electrostatic charge variation being determined to be less than the threshold value.

11. The device of claim 9 wherein the processor is configured to generate a warning in response to the measured electrostatic charge variation being determined to be less than the threshold value.

12. The device of claim 2 wherein the processor is configured to generate the reliability index in response to the reliability index remaining the same value for a determined amount of time.

13. The device of claim 1 wherein the processor is configured to adjust operation of the optical sensor based on the level of accuracy of the measurement.

14. The device of claim 1 wherein the optical sensor includes at least one of a heart rate sensor or an oxygen sensor.

15. The device of claim 1 wherein the processor is configured to filter the measured electrostatic charge variation to remove frequencies from the measured electrostatic charge variation.

16. A method, comprising:
generating, by an optical sensor, a measurement;
receiving, by a receiving electrode, electrostatic charge variation, the optical sensor being positioned between the receiving electrode and a ground electrode electrically coupled to ground;
measuring, by an electrostatic charge sensor, the electrostatic charge variation;
generating a reliability index of the measurement based on the measured electrostatic charge variation; and
adjusting operation of the optical sensor based on the reliability index.

17. The method of claim 16, further comprising:

determining the measured electrostatic charge variation is greater than a threshold value, the reliability index indicating the measurement is reliable in response to determining the measured electrostatic charge variation is greater than the threshold value.

18. The method of claim 16, further comprising:

determining the measured electrostatic charge variation is less than a first threshold value and greater than a second threshold value smaller than the first threshold value, the reliability index indicating the measurement is moderately reliable in response to determining the measured electrostatic charge variation is less than the first threshold value and greater than the second threshold value.

19. The method of claim 16, further comprising:

determining the measured electrostatic charge variation is less than a threshold value, the reliability index indicating the measurement is unreliable in response to determining the measured electrostatic charge variation is less than the threshold value.

20. A device, comprising:

an optical sensor configured to generate a measurement;

a ground electrode electrically coupled to a ground of the device, the ground electrode positioned on a surface of the device;

a receiving electrode configured to receive electrostatic charge variation, the receiving electrode positioned on the surface of the device, the optical sensor positioned between the ground electrode and the receiving electrode;

an electrostatic charge sensor configured to measure the electrostatic charge variation; and a processor configured to:

generate a reliability index of the measurement based on the measured electrostatic charge variation; and adjust operation of the optical sensor based on the reliability index.

21. The device of claim 20 wherein the device is an electronic watch.

22. The device of claim 21 wherein the optical sensor, the ground electrode, and the receiving electrode are configured to physically contact a user's skin when the device is worn by the user.

\* \* \* \* \*